Figure 1:
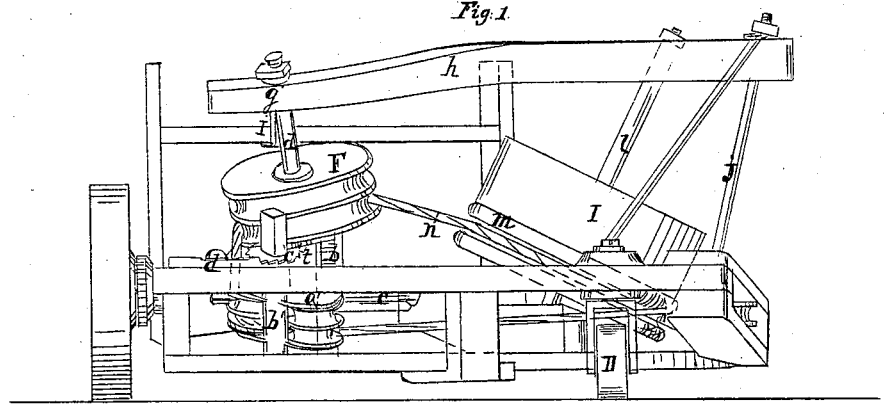

J. Silver.
Flax Harvester.

No. 48,731. Patented July 11, 1865.

Witnesses:

Inventor:

UNITED STATES PATENT OFFICE.

JOHN SILVERS, OF LAMBERTSVILLE, NEW JERSEY.

IMPROVEMENT IN FLAX-PULLING MACHINES.

Specification forming part of Letters Patent No. 48,731, dated July 11, 1865.

*To all whom it may concern:*

Be it known that I, JOHN SILVERS, of Lambertsville, in the county of Hunterdon and State of New Jersey, have invented new and useful Improvements in Machines for Gathering or Pulling Flax and Hemp; and I do hereby declare that the following is a full, clear, and exact description thereof, which will enable those skilled in the art to make and use the same, reference being had to the accompanying drawings, forming part of this specification.

The present invention relates more particularly to certain new and useful improvements in a machine invented and patented by me in connection with William Britain, on the 25th day of November, A. D. 1838, for gathering flax and hemp; and it consists, first, in the use of one or more elastic belts or bands, made either of india-rubber or gutta-percha, or of any of their respective elastic compounds, between which and the revolving drum around which they pass the flax-plants are clasped, and thereby pulled out of the ground and carried far enough round by the drum to be deposited on the platform of the machine, suitably arranged therefor, the said band or bands being passed from the drum at the required point and around suitable guiding-pulleys; second, in interposing between the clasping-point of the flax-plants by the belt upon the drum, as described, and the ground over which the machine is being drawn, a horizontal curved guiding-bar, along the inner edge of which the plants pass as they are pulled around by the drum, and, from its form, guided to the platform upon they are to be deposited, the said bar being so arranged with regard to the drum as to keep the flax-plants being drawn by it from the ground in close contact therewith, thereby greatly facilitating the same, as well as assisting and relieving the band of a considerable strain, which would necessarily come upon it if the curved bar were not used; third, in a peculiar arrangement of pulleys, to be hereinafter described, around which the elastic clasping-belts are passed for the purpose of regulating the tension of the same at pleasure; fourth, in covering the bearing-surface of the drum, between which and the elastic bands the flax-plants are clasped, as described, with a sheet or surface of india-rubber or gutta-percha, or any of their respective elastic compounds, the principal object of which, as well as also in the use of the elastic clasping-bands, being to grasp the flax-plants in such a manner and by such means that, while a sufficiently tight grasping of them is obtained to insure their being pulled out of the ground as the drum revolves, the danger of a breakage of the plants is entirely obviated, the great importance of which is obvious to all conversant with the manufacture of flax or hemp.

Figure 2:
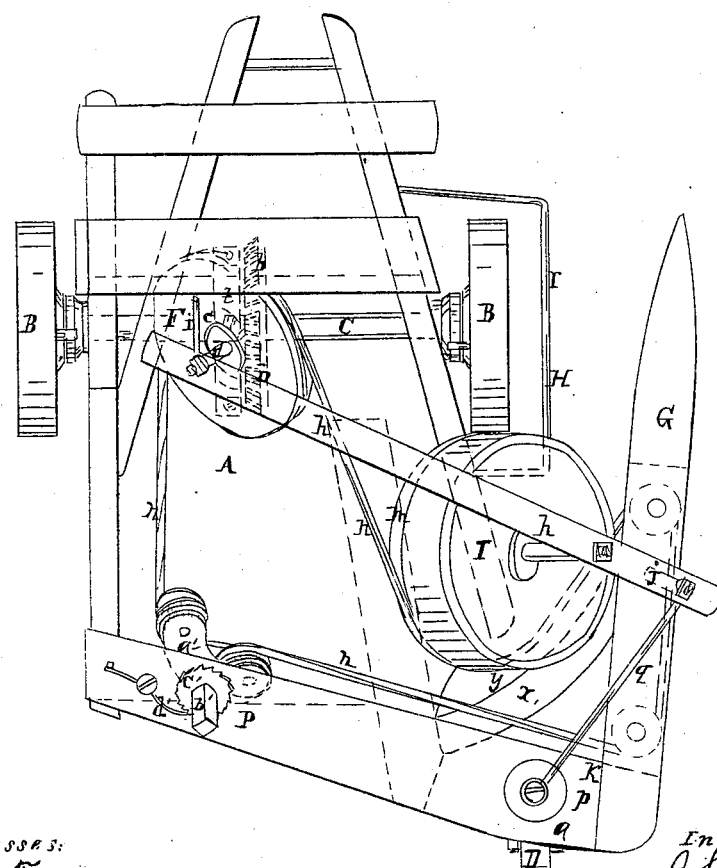

My improvements are represented in the accompanying plate of drawings, of which Figure 1 is a plan or top view of a flax-pulling machine made generally according the description contained in the schedule annexed to and forming a part of the aforesaid Letters Patent, but with my several improvements applied thereto; Fig. 2, a view of the rear end of the same.

A A represent the platform of the machine, placed upon wheels B B of an axle, C, extending across its front end, the rear end of which platform is considerably wider than the front end, projecting a short distance beyond one of the wheels B, and supported by another wheel, D, at or near its extreme end, *a*.

On axle C, and at or near its center, is secured a bevel-gear wheel, *b*, interlocking with which is a horizontally-inclined smaller bevel-gear, *c*, fastened to and upon the under side of a similarly-inclined drum or pulley, F, turning upon an upright shaft, *d*, having bearings at one end in standard *f* of platform, and at the other in the end *g* of a horizontal cross-bar, *h*, supported at each end by stanchions *i* and *j* of the platform.

G is a pointed arm, secured to the side *k* of the platform and projecting therefrom toward and outside of one of the front wheels, B, of the machine, leaving an open space, H, between the said wheel and the arm. At the rear portion of the opening H, and inclined toward the arm G, is a drum, I, turning upon a vertical inclined shaft, *l*, having bearings at one end in cross-bar *h* and at the other in the platform, in a groove, *m*, of the lower portion of which an endless elastic belt or band, *n*, made of india-rubber or gutta-percha, or of any of their respective elastic compounds, passes partially around and then upward over the platform to and also partially around the inclined pulley F, from whence it passes around a series of small guiding-pulleys, *o o o o*, placed at suitable guiding-points within the end and side pieces $p$ and $q$ of the platform, to the drum again, as plainly shown in the drawings.

As the machine is drawn over the ground from which it is desired to gather the flax and hemp plants thereon, with the use of one or more horses properly harnessed to its front end, the plants thereby inclosed or embraced in the open space between the pointed arm and the side of the machine (a guard, $r$, being placed about the wheel to prevent them from becoming entangled about the wheel) are, as the drum approaches toward them, taken in and clasped by and between it and its endless belt, (receiving motion through the revolution of the axle-shaft connected with the pulley F, as described,) by which they are then carried around the drum, and at the same time gradually pulled from the ground to and upon the platform, where they are deposited as the belt leaves the drum to pass to the pulley F, the drum, against which the elastic belt holds the plants, as described, being arranged in such a manner and position as to give the belt a sufficient movement in an upward direction to pull the plants out of the ground, as desired.

The periphery of the drum I, against which the plants are held, I cover with a sheet or coating of india-rubber or gutta-percha, so that an elastic surface shall be imparted thereto, the object of which, as well in the use of the elastic band, being to so grasp the plants as to secure sufficient hold upon them to withdraw them from the ground without in the least breaking or injuring them, the advantages of which are evident.

Between the point at which the plants are clasped by the belt and drum, as described, and attached to or forming a part of the platform, extending across from the projecting arm G at or near the point where the belt first commences to clasp the plants, and in a circular direction therefrom a short distance around the pulley to the main portion of the platform, is a circular arm or bar, $x$, against the edge $y$ of which the plants bear as they are pulled around by the drum, and thus not only kept in close contact therewith by the same, but also their withdrawal from the ground greatly facilitated and a considerable amount of strain relieved from the belt, as is evident.

To enable the belt to be tightened or loosened at pleasure, according as may be desired, I pass the same partially around and over two pulleys hung in a swinging frame, $a'$, of the platform and its end piece, turning by a shaft, $b'$, in the same, to the upper end of which is secured a ratchet-wheel, $c'$, with which engages a spring-pawl, $d'$, of the end piece, by the turning of which frame to the right or left, and then inserting the pawl within the teeth of its ratchet, the tension of the belt can be increased or decreased in any desired degree.

In lieu of using only one belt, as described, more may be used, it being only necessary that they should have the same general arrangement and mode of operation herein described.

I am aware that it is an old idea to so arrange belt-pulleys that they may be adjusted so as to increase or diminish the tension of the belts which run upon them, therefore I do not wish to be understood as claiming the idea broadly.

I claim as new and desire to secure by Letters Patent—

1. The use of one or more elastic belts or bands, made either of india-rubber or gutta-percha, or of any of their respective elastic compounds, or of any other suitable elastic material, for the purpose specified.

2. Coating the drum between which and the belt the plants are clasped, as described, with a sheet or surface of india-rubber or any other suitable elastic material, for the purpose specified.

3. The use of the curved bar $x$, attached to or forming a part of the platform of the machine and arranged with regard to the drum thereof, by which the plants are pulled, substantially as herein described, and for the purposes specified.

4. Passing the elastic belt around a pulley or pulleys when fixed within the frame $a$, and adapted to be turned by means of the shaft $b'$, and retained in the desired position by the ratchet-wheel $c'$ and pawl $d'$, whereby the tension of the said elastic belt may be varied, as described.

JOHN SILVERS.

Witnesses:
WM. JOHNSON,
I. FENIMORE BOOZER.